UNITED STATES PATENT OFFICE.

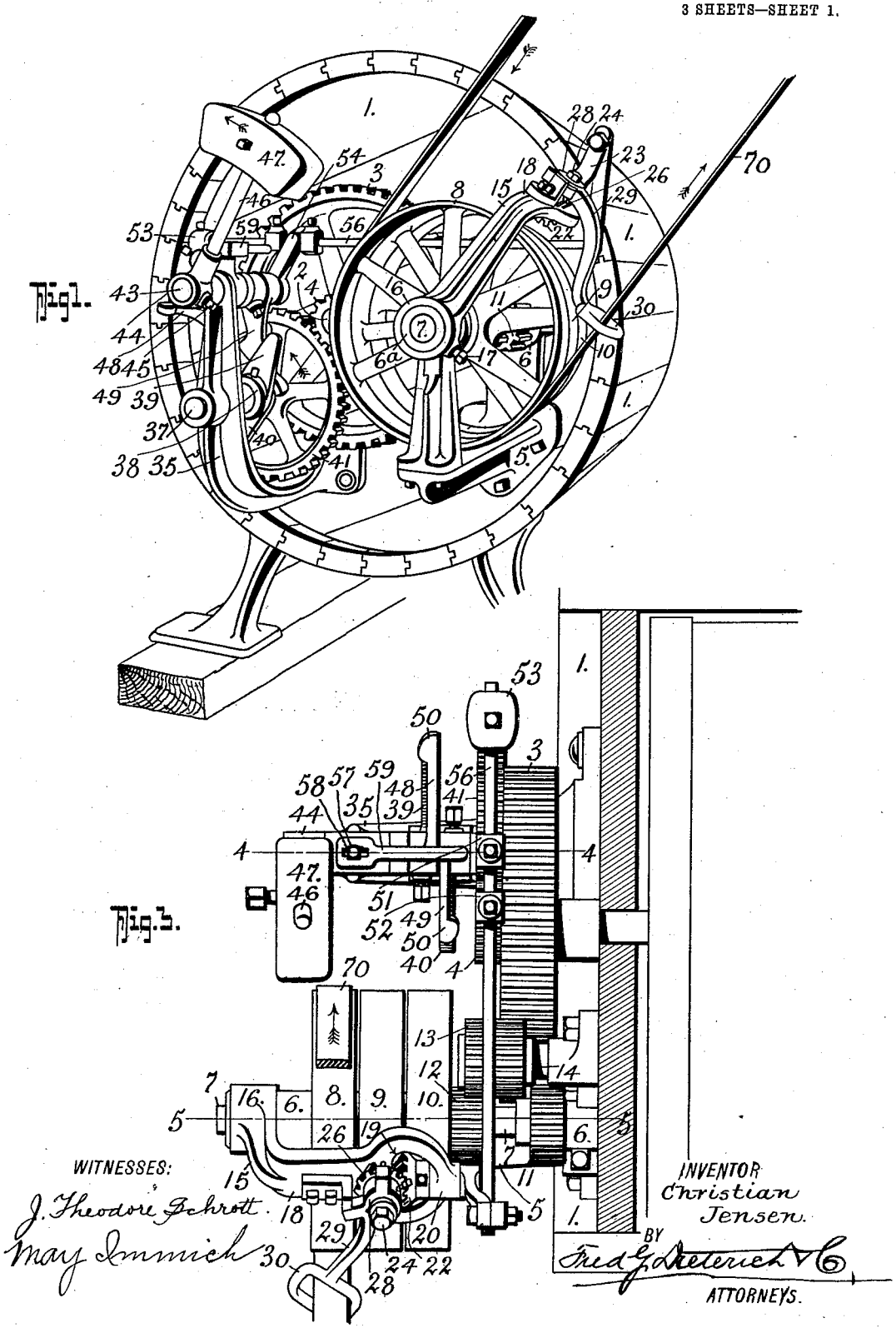

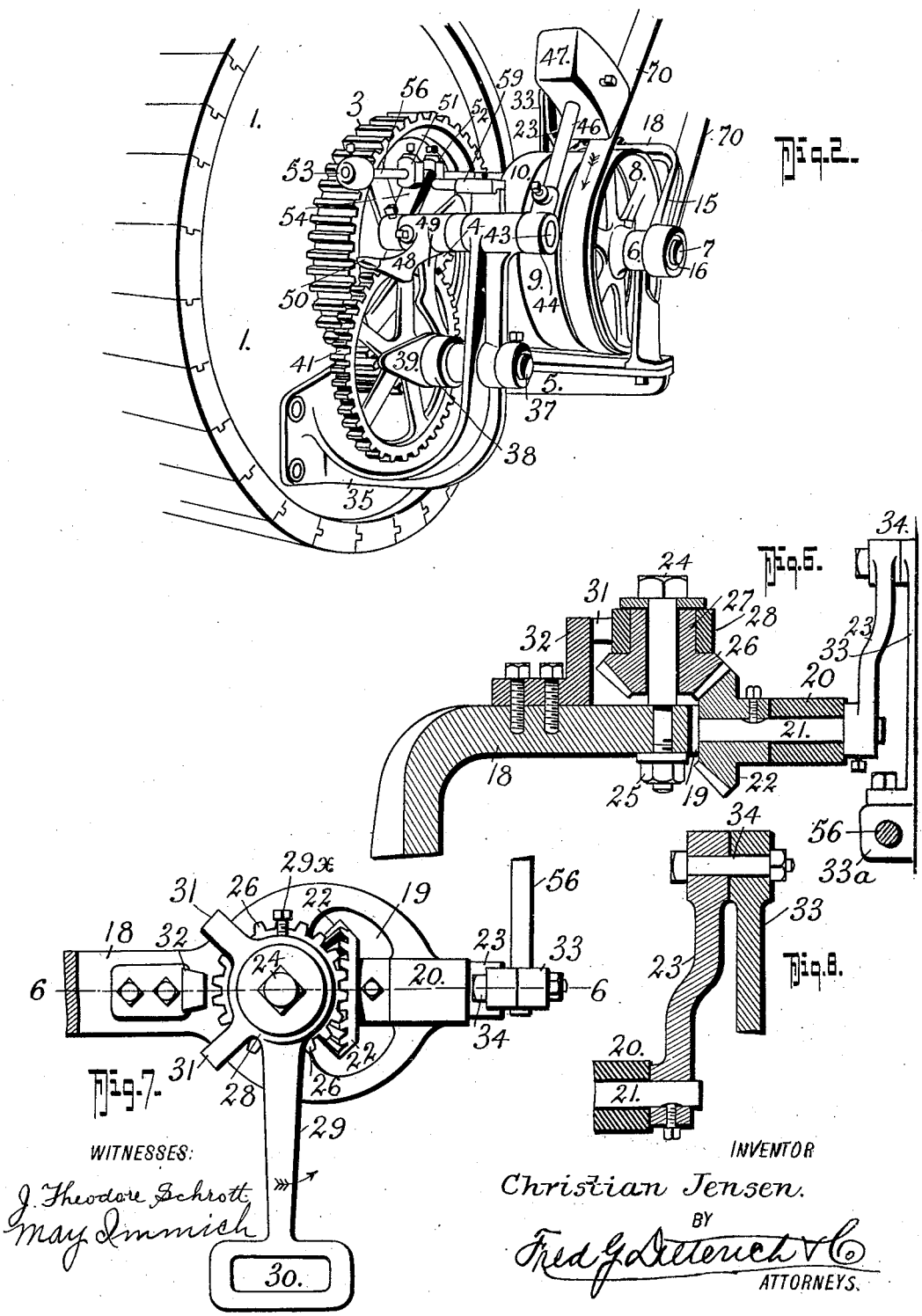

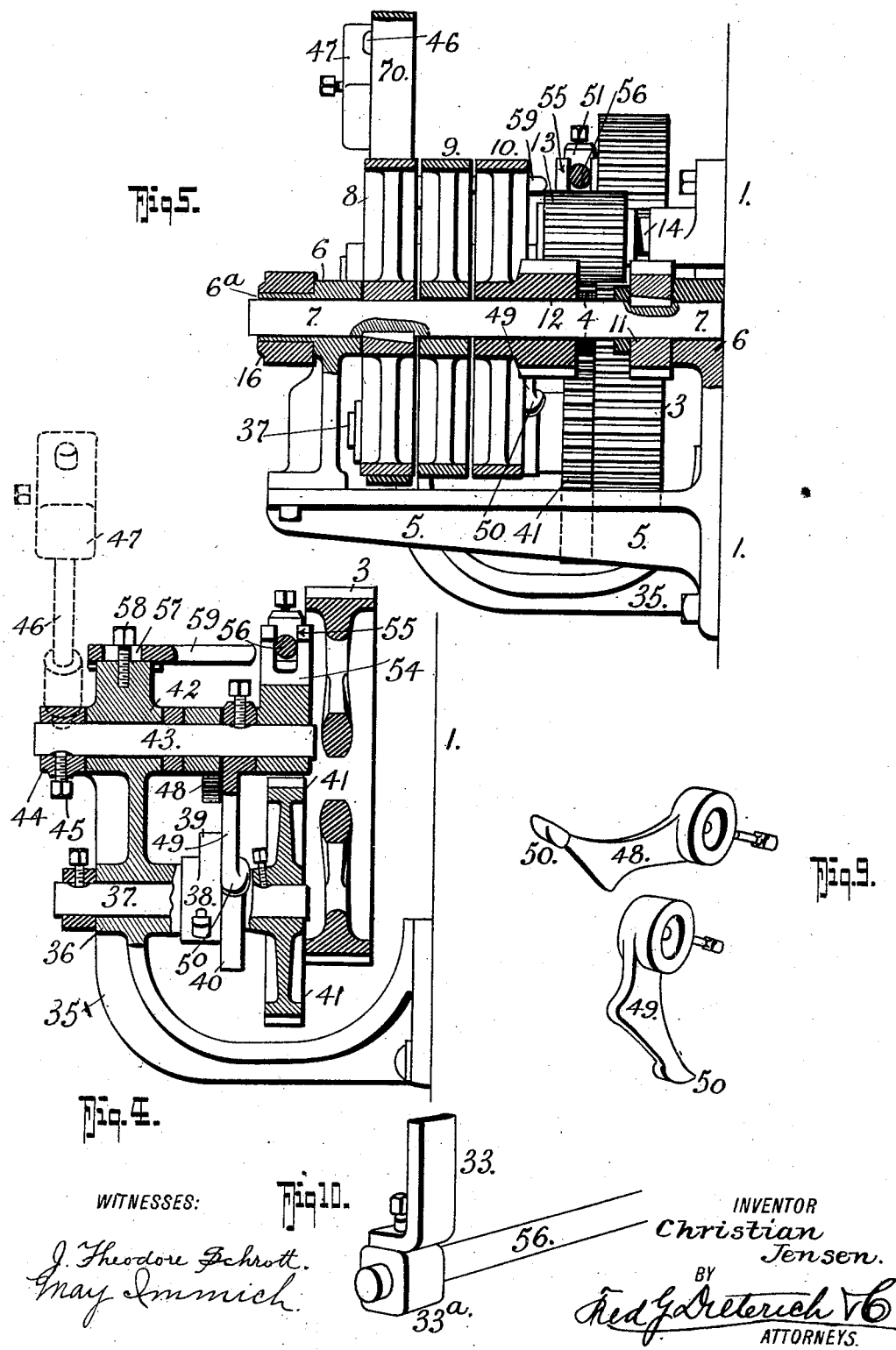

CHRISTIAN JENSEN, OF PALMYRA, NEW JERSEY.

DRIVE MECHANISM.

934,534.

Specification of Letters Patent. Patented Sept. 21, 1909.

Application filed April 2, 1909. Serial No. 487,472.

*To all whom it may concern:*

Be it known that I, CHRISTIAN JENSEN, residing at Palmyra, in the county of Burlington and State of New Jersey, have invented certain new and useful Improvements in Drive Mechanism, of which the following is a specification.

My present invention is an improvement on the drive mechanism disclosed in my copending application filed Nov. 27, 1908, Serial No. 464,582, and it primarily has for its object to simplify the construction of the several parts and make them more effective in their operation.

In the present invention I provide an oscillating shaft having a weighted arm for effecting a part of the oscillatory movement of the shaft, which shaft has a pair of cam engaging arms to coöperate with cams on a cam shaft that is geared with the cylinder shaft to be actuated directly therefrom. A forked arm on the oscillatable shaft receives a rod that is connected with a belt shifter and actuates the same.

My invention also includes those other novel details of construction, combination and arrangement of parts all of which will be first described, then be specifically pointed out in the appended claims and illustrated in the accompanying drawings, in which:

Figure 1, is a perspective view illustrating the application of my invention. Fig. 2, is another perspective view taken from a different position. Fig. 3, is a top plan view of my invention. Fig. 4, is a section on the line 4—4 of Fig. 3. Fig. 5, is a section on the line 5—5 of Fig. 3. Fig. 6, is a detail section on the line 6—6 of Fig. 7. Fig. 7, is a plan view of the parts shown in Fig. 6. Fig. 8, is a detail section of a part of my invention. Fig. 9, is a detail perspective view of the two cam engaging arms. Fig. 10, is a detail perspective view of a part of my invention.

Referring now to the accompanying drawings in which like letters and numerals of reference indicate like parts, 1 represents the washing machine casing and 2 the cylinder shaft which projects through the casing head and carries a master gear 3 and a pinion 4.

A bracket 5 is secured to the cylinder head, in bearings 6—6 of which, driving shaft 7 is mounted. Pulleys 8, 9 and 10 are mounted on the shaft 7, two of which, 9 and 10, are loose on the shaft, and the other, 8, is fast thereon.

A pinion 11 on the shaft 7 meshes with the master gear 3 on the cylinder or driven shaft 2, while the pulley 10 has a pinion 12 that meshes with an idler pinion 13 on a stub shaft 14, the pinion 13 in turn meshing with the master gear 3.

The outer bearing 6 of the shaft 7 has an extension 6ª to receive the collar, or bearing portion 16, of a bracket 15, the bracket 15 being adjustably secured in place by a set screw 17.

The bracket 15 has a right-angled extension 18, terminating in a bearing 20, for the crank shaft 21 and has an aperture 19 to receive the bevel gear 22 that is secured to the shaft 21. A crank 23 serves to rock the shaft 21 in its bearing 20.

On a stub shaft or bolt 24 that is secured to the extension 18 by a nut 25, is a bevel gear 26 that meshes with the gear 22 and has a hub 27 to receive the collar 28 of the belt shifter arm 29, whose free end has an aperture 30 to permit passage of the driving belt 60. The arm 29 is secured to the hub 27 by a set screw 29ˣ.

Stops 31 are provided on the collar 28 to engage a fixed stop 32 secured to the bracket part 18, the stop serving to limit the swinging movement of the arm 29 and gear 26 on the shaft 24.

33 is an arm pivoted to the crank 23 at 34 and secured to the shifting rod 56 at 33ª.

A second bracket 35 is secured to the cylinder head and has bearings 36 and 42 for the shafts 37 and 43 respectively. The shaft 37 is the cam shaft which carries a cam member 38 having a pair of cams 39 and 40.

A gear 41 on the shaft 37 meshes with the pinion 4 and serves to impart motion to the cam shaft 37 directly from the cylinder shaft 2.

The shaft 43 is the oscillatable shaft to which the cam engaging arms 48 and 49 are secured to coöperate with the cams 39 and 40, respectively. The shaft 43 also has a forked arm 54 forked at 55 to receive the shifting rod 56. A socketed member 44 is secured to the shaft 43 by a set screw and receives an arm 46, on which is an adjustable weight 47 that serves to move the shaft 43 during a portion of its oscillations. Each arm 48 and 49 has a portion 50 that bears against the cams 39 and 40.

Adjustable stops 51 and 52 on the rod 56 engage the forked arm 54 to limit the movement of the rod, while an adjustable weight 53 counterbalances the rod 56 in its fulcrum on the forked arm 54.

An arm 59 is secured to the bracket 35 to project adjacent to the arm 54 by a set screw 58 that passes through a slot 57 in the arm 59, so that by removing the rod 56 from the forked arm 54 and placing it over the arm 59 with the stops 51—52, one on each side of the arm, the belt 70 will be held on the central or loose pulley and the driving shaft 7 will remain at rest.

Operation: Assume the belt 70 to be turning in the direction of the arrow in Figs. 1, 2 and 3, and assume that it is now located upon the pulley 8, motion will then be imparted to the shaft 7 to turn the cylinder 2 in a clockwise direction in Fig. 1, thus imparting a counter-clockwise movement to the cam shaft 37. As soon as the cam 40 engages the portion 50 of the arm 49, it will turn the shaft 43 in the same direction as the shaft 37, to move the weight 47 in the direction of the arrow in Fig. 1, which weight, as soon as it passes the dead center will rapidly complete the movement of the shaft 43 in such direction. The movement of the shaft 43 causes the rod 56 to be moved from right to left in Fig. 1, and impart its motion to the crank 23 to turn the shaft 21 in the direction of the arrow in Fig. 6, thereby turning the gear 26 and the belt shifter 29 in the direction of the arrow in Fig. 7 to shift the belt from the pulley 8 onto the pulley 10. Now as the belt is shifted on the pulley 10 the cylinder shaft 2 will be turned in a counter-clockwise direction to impart motion to the cam shaft 43 in a direction opposite to the arrow in Fig. 1, until the cam 39 engages the portion 50 of the foot 48 which will cause the oscillatable shaft 43 to be oscillated and move the weight 37 in a direction opposite to the arrow in Fig. 1, which weight as it passes the dead center will complete the oscillatable movement of the shaft 43. The movement of the shaft 43 will thus shift the rod 56 back to the position shown in Fig. 1, and in consequence thereof the belt shifter 29 will be shifted in a direction opposite to the arrow in Fig. 7, to return the belt 70 onto the pulley 8 when the foregoing cycle of operation will be repeated.

When it is desired to stop the mechanism the operator may lift the rod 56 out of the fork 55 of the lever 54 and place it on the member 59 with one of the stops 51 on one side of the member 59 and the other stop 52 on the other side of the member 59 to hold the belt shifting member 29 in its mid-position, indicated in Fig. 7, to retain the belt 70 on the loose pulley 9 and stop the operation of the shaft 7 and consequently the cylinder shaft 2.

From the foregoing description taken in connection with the accompanying drawings it is thought the complete construction, operation and numerous advantages of my invention will be readily understood by those skilled in the art to which it appertains.

What I claim is:

1. In a drive mechanism, a driving shaft, a series of pulleys thereon, a driven shaft, operative connections between certain of said pulleys and the driven shaft, a driving belt taking around said pulleys, a belt shifting arm for shifting the belt from one pulley to another, a cam shaft, gear connections between the cam shaft and the driven shaft, cams on said cam shaft, an oscillatable shaft, arms on said oscillatable shaft to engage said cams, and connections between the oscillatable shaft and the belt shifting member for actuating the belt shifting member from the oscillatable shaft.

2. In a drive mechanism, a driving shaft, a series of pulleys thereon, a driven shaft, operative connections between certain of said pulleys and the driven shaft, a driving belt taking around said pulleys, a belt shifting arm for shifting the belt from one pulley to another, a cam shaft, gear connections between the cam shaft and the driven shaft, cams on said cam shaft, an oscillatable shaft, arms on said oscillatable shaft to engage said cams, connections between the oscillatable shaft and the belt shifting member for actuating the belt shifting member from the oscillatable shaft, and means independent of the cams for effecting a part of the oscillatable movement of the oscillatable shaft.

3. In a drive mechanism, a driving shaft, a series of pulleys thereon, a driven shaft, operative connections between certain of said pulleys and the driven shaft, a driving belt taking around said pulleys, a belt shifting arm for shifting the belt from one pulley to another, cam shaft, gear connections between the cam shaft and the driven shaft, cams on said cam shaft, an oscillatable shaft, arms on said oscillatable shaft to engage said cams, an arm on said oscillatable shaft, means for pivotally mounting said belt shifting arm, means for moving said belt shifting arm on its pivot, by virtue of which the movement of the oscillatable shaft is imparted to said connecting means.

4. In a drive mechanism, a driving shaft, a series of pulleys thereon, a driving belt taking around said pulleys, a bracket support, a belt shifting arm pivoted thereto, a crank shaft mounted in said support, gear connections between the crank shaft and the belt shifting arm, a driven shaft, operative connections between certain of said pulleys and said driven shaft, and means actuated from the driven shaft and coöperatively connected with said crank shaft for oscillating the same to move the belt shifting arm and shift the belt from one pulley to another.

5. In a drive mechanism, a driving shaft, a series of pulleys thereon, a driving belt taking around said pulleys, a bracket support, a belt shifting arm pivoted thereto, a crank shaft mounted on said support, gear connections between the crank shaft and the belt shifting arm, a driven shaft, operative connections between certain of said pulleys and said driven shaft, means actuated from the driven shaft and coöperatively connected with said crank shaft for partly oscillating the same to move the belt shifting arm and shift the belt from one pulley to another, and means independent of the driven shaft for completing the oscillation of the crank shaft.

6. In a drive mechanism, a driving shaft, a plurality of pulleys mounted thereon, one of said pulleys being fixed to the driving shaft, and the other pulleys being loose thereon, a driven shaft, gear connections between the driving shaft and the driven shaft, gear connections between one of said pulleys and the driven shaft, a driving belt taking around said pulleys, a pivoted belt shifting member coöperating with said belt to shift it from one pulley to another, a crank shaft, gear connections between the crank shaft and the pivoted belt shifting member, an oscillatable shaft, connections between the oscillatable shaft and the crank shaft, a cam shaft, cams carried by the cam shaft, arms carried by the oscillatable shaft to coöperate with the cams, and means for imparting motion to the cam shaft to oscillate the oscillatable shaft and actuate the belt shifting member.

7. In a drive mechanism, a driving shaft, fast and loose pulleys thereon, a driven shaft, operative connections between the driving shaft and the driven shaft, and between said loose pulley and the driven shaft, a driving belt taking around said pulleys, a support, a belt shifting member pivoted to said support, a stop for limiting the pivotal movement of said belt shifting member, a shifting rod, connections between the shifting rod and said pivoted belt shifting member whereby the movement of the rod is imparted to the belt shifting member to turn it on its pivot, an oscillatable shaft, connections between the oscillatable shaft and the shifting rod for imparting the motion of the oscillatable shaft to said rod, and means actuated from the driven shaft for oscillating said oscillatable shaft.

8. In a drive mechanism, a driving shaft, fast and loose pulleys thereon, a driven shaft, operative connections between the driving shaft and the driven shaft, and between said loose pulley and the driven shaft, a driving belt taking around said pulleys, a support, a belt shifting member pivoted to said support, a stop for limiting the pivotal movement of said belt shifting member, a shifting rod, connections between the shifting rod and said pivoted belt shifting member whereby the movement of the rod is imparted to the belt shifting member to turn it on its pivot, an oscillatable shaft, connections between the oscillatable shaft and the shifting rod, for imparting the motion of the oscillatable shaft to said rod, a cam shaft, gear connections between the cam shaft and the driven shaft, cams carried by the cam shaft, arms carried by the oscillatable shaft to coöperate with said cams by virtue of which said cams will engage said arms to effect a part of the oscillatable movement of the oscillatable shaft.

9. In a drive mechanism, a driving shaft, fast and loose pulleys thereon, a driven shaft, operative connections between the driving shaft and the driven shaft, and between said loose pulley and the driven shaft, a driving belt taking around said pulleys, a support, a belt shifting member pivoted to said support, a stop for limiting the pivotal movement of said belt shifting member, a shifting rod, connections between the shifting rod and said pivoted belt shifting member whereby the movement of the rod is imparted to the belt shifting member to turn it on its pivot, an oscillatable shaft, connections between the oscillatable shaft and the shifting rod for imparting the motion of the oscillatable shaft to said rod, a cam shaft, gear connections between the cam shaft and the driven shaft, cams carried by the cam shaft, arms carried by the oscillatable shaft to coöperate with said cams, by virtue of which said cams will engage said arms to effect a part of the oscillatable movement of the oscillatable shaft, and a weighted arm carried by the oscillatable shaft for completing the movement thereof.

10. In a driving mechanism, a driven shaft, a driving shaft, fast and loose pulleys on said driving shaft, operative connections between the loose pulley and the driven shaft, and between the driving shaft and the driven shaft, a driving belt passing around said pulleys, a pivoted belt shifting member for shifting said belt from one pulley to another, a crank shaft geared with said pivoted belt shifting member for actuating the same, a shifting rod connected with said crank shaft to turn the crank shaft, an oscillatable shaft, a forked arm on the oscillatable shaft to receive said rod, stops on the shifting rod to coöperate with said forked arm, and means for oscillating said oscillatable shaft.

11. In a driving mechanism, a driven shaft, a driving shaft, fast and loose pulleys on said driving shaft, operative connections between the loose pulley and the driven shaft, and between the driving shaft and the driven shaft, a driving belt passing around said pulleys, a pivoted belt shifting member for shifting said belt from one pulley to another, a crank shaft geared with said pivoted belt shifting member for actuating the same, a shifting rod connected with said crank shaft to turn the crank shaft, an oscillatable shaft, a forked arm on the oscillatable shaft to receive said rod, stops on the shifting rod to coöperate with said forked arm, an adjustable weight carried by said shifting rod at one end, a cam shaft geared with said driven shaft, cam engaging members carried by the oscillatable shaft, cams on the cam shaft to coöperate therewith, by virtue of which the movement of the cam shaft will be imparted to the oscillatable shaft.

12. In a driving mechanism, a driven shaft, a driving shaft, fast and loose pulleys on said driving shaft, operative connections between the loose pulley and the driven shaft, and between the driving shaft and the driven shaft, a driving belt passing around said pulleys, a pivoted belt shifting member for shifting said belt from one pulley to another, a crank shaft geared with said pivoted belt shifting member for actuating the same, a shifting rod connected with said crank shaft to turn the crank shaft, an oscillatable shaft, a forked arm on the oscillatable shaft to receive the said rod, stops on the shifting rod to coöperate with said forked arm, an adjustable weight carried by said shifting rod at one end, a cam shaft geared with said driven shaft, cam engaging members carried by the oscillatable shaft, cams on the crank shaft to coöperate therewith, by virtue of which the movement of the cam shaft will be imparted to the oscillatable shaft to effect a part of the oscillatable movement thereof, and gravity actuated means carried by the oscillatable shaft for completing the oscillation thereof.

CHRISTIAN JENSEN.

Witnesses:
WM. E. HIRES,
GEO. N. SHADE.